United States Patent
Al-AbdulJabbar et al.

(10) Patent No.: US 12,387,117 B2
(45) Date of Patent: Aug. 12, 2025

(54) INJECTOR RISKINESS SCORE (IRS) MATRIX

(71) Applicant: Saudi Arabian Oil Company, Dhahran (SA)

(72) Inventors: Ahmad Mohammad Al-AbdulJabbar, Dammam (SA); Abdullah Hasan Al-Oqaili, Al-Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 930 days.

(21) Appl. No.: 17/517,023

(22) Filed: Nov. 2, 2021

(65) Prior Publication Data

US 2023/0252322 A1    Aug. 10, 2023

(51) Int. Cl.
| | | |
|---|---|---|
| *G06F 3/048* | (2013.01) | |
| *E21B 41/00* | (2006.01) | |
| *E21B 43/20* | (2006.01) | |
| *G06F 3/04847* | (2022.01) | |
| *G06N 5/04* | (2023.01) | |

(52) U.S. Cl.
CPC ............... *G06N 5/04* (2013.01); *E21B 41/00* (2013.01); *E21B 43/20* (2013.01); *G06F 3/048* (2013.01); *G06F 3/04847* (2013.01)

(58) Field of Classification Search
None
See application file for complete search history.

(56) References Cited

U.S. PATENT DOCUMENTS

| | | | |
|---|---|---|---|
| 6,904,366 B2 | 6/2005 | Patzek et al. | |
| 7,963,327 B1 | 6/2011 | Saleri et al. | |
| 8,175,751 B2 | 5/2012 | Thakur et al. | |
| 8,307,893 B2 | 11/2012 | Sierra et al. | |
| 9,140,108 B2 | 9/2015 | Shirzadi et al. | |
| 9,605,529 B1* | 3/2017 | Venter | G06F 30/20 |
| 2009/0132458 A1* | 5/2009 | Edwards | G06N 5/025 |
| | | | 702/9 |
| 2010/0300682 A1* | 12/2010 | Thakur | E21B 43/16 |
| | | | 166/250.01 |
| 2013/0063269 A1* | 3/2013 | Lee | G21C 19/07 |
| | | | 340/584 |
| 2015/0354349 A1* | 12/2015 | Sauders | E21B 47/00 |
| | | | 340/853.1 |
| 2020/0355839 A1* | 11/2020 | Jeong | G06N 20/00 |

OTHER PUBLICATIONS

SAIP Examination Report in Saudi Arabian Application No. 122440487, dated Nov. 30, 2023, 11 pages (with English translation).

* cited by examiner

*Primary Examiner* — Xuyang Xia

(74) *Attorney, Agent, or Firm* — Fish & Richardson P.C.

(57) ABSTRACT

Systems and methods include a computer-implemented method for determining risks of injector wells. Inputs for multiple risk criteria are received through an injector riskiness score (IRS) user interface for processing risks posed by an injector well to a new well being drilled in proximity to the injector well. A weighted sum of values corresponding to inputs for the risk multiple criteria is determined based on the inputs. An IRS score is determined based on the weighted sum. A determination is made whether the injector well has an IRS score above a predefined threshold. A shut-down recommendation for the injector well is identified in response to determining that the injector well has an IRS score above the predefined threshold.

20 Claims, 12 Drawing Sheets

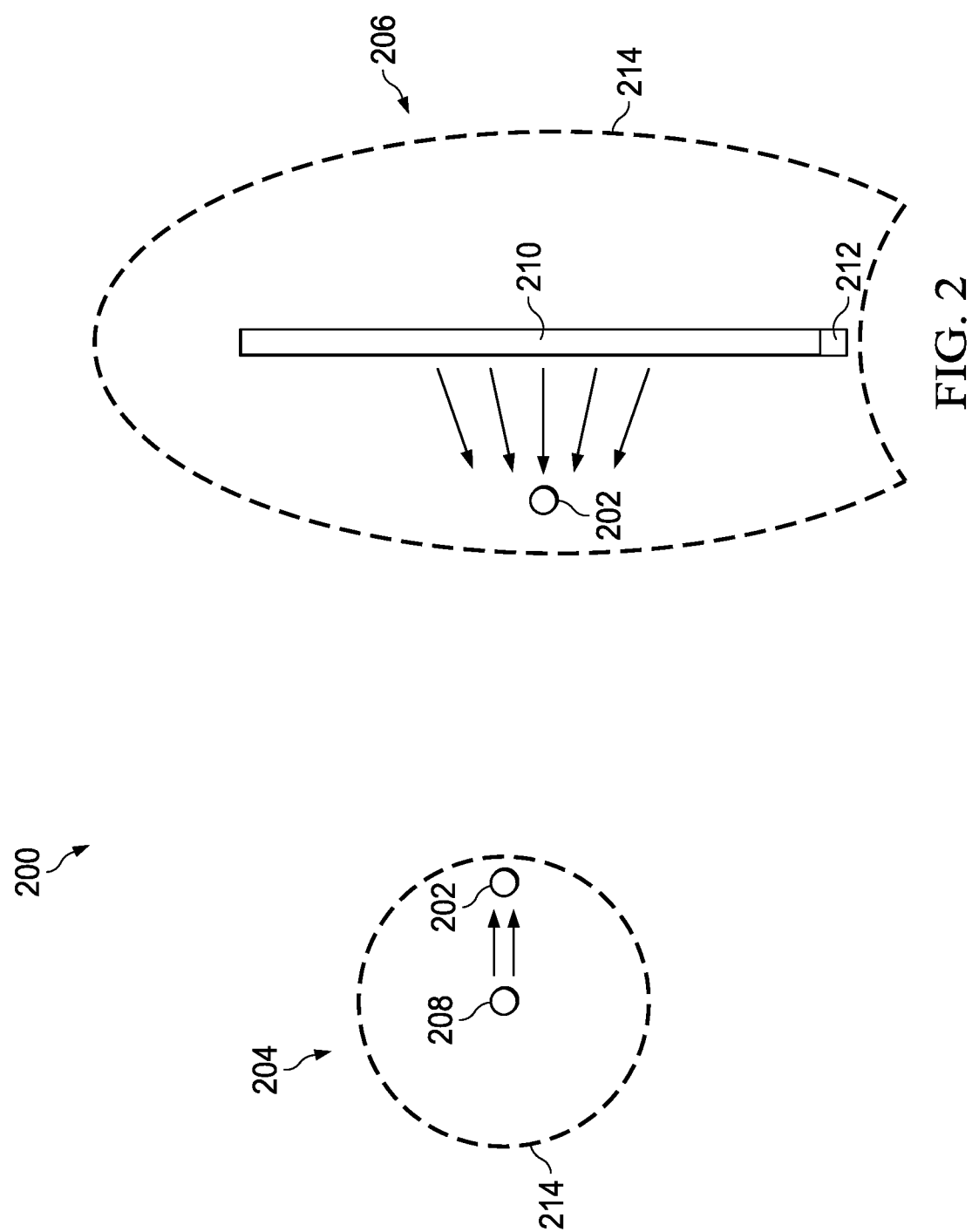

INJECTOR RISKINESS SCORE (IRS) MATRIX

TECHNICAL FIELD

The present disclosure applies to managing injector wells, for example, in the oil industry.

BACKGROUND

Water injection is used in the oil and gas industry as a technique for maintaining reservoir pressure to facilitate the natural flow of hydrocarbons. Typically, water injectors are located on the flank of a reservoir to push and sweep hydrocarbons toward an oil field's center, where producer wells are located. In some cases, injection is done for the purpose of disposing of water. This is done by injecting disposal water in non-hydrocarbon formation. When drilling a hydrocarbon well from the surface, the well path may encounter non-hydrocarbon formations along the way. The pressure in non-hydrocarbon formations will differ over time, such as from year to year, since pressure values are being altered artificially through injection. Risks exist that are associated with drilling wells across zones of non-hydrocarbon formations, high-pressure zones (compared to surrounding layers), sudden well flow, and wellbore contamination.

Unlike these injection zones, normal and natural layers have near-constant pressures that may take years or decades to change, as well as constant formation-water properties. On the other hand, the layers in which water is being injected can experience sudden pressure increases or decreases, depending on production/injection ratios. The increases and decreases can complicate the estimation of formation pressures. Moreover, water properties, such as salinity, are altered from the water that is injected. The change in water properties can significantly affect drilling mud properties, making it difficult to predict how to respond to current formation salinity levels.

Conventional practices typically include shutting down injectors before drilling any new wells in their vicinity. However, disturbing these injectors can provide adverse consequences in the dynamics of hydrocarbon production in the field. Also, procedures do not exist for identifying which injectors pose a threat to the wells being drilled in the same area.

SUMMARY

The present disclosure describes techniques that can be used for managing injector wells, for example, in the oil industry. In some implementations, a computer-implemented method includes the following. Inputs for multiple risk criteria are received through an injector riskiness score (IRS) user interface for processing risks posed by an injector well to a new well being drilled in proximity to the injector well. A weighted sum of values corresponding to inputs for the risk multiple criteria is determined based on the inputs. An IRS score is determined based on the weighted sum. A determination is made whether the injector well has an IRS score above a predefined threshold. A shut-down recommendation for the injector well is identified in response to determining that the injector well has an IRS score above the predefined threshold.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The subject matter described in this specification can be implemented in particular implementations, so as to realize one or more of the following advantages. The techniques of the present disclosure can overcome limitations in conventional systems that may enhance hydrocarbon recovery but do not optimize the injection process. For example, the techniques of the present disclosure can include mechanisms for determining when to shut down an injector when a new well is drilled near the injector. Conventional approaches may shutdown injectors that are nearby within a particular distance, such as a few hundred meters. However, such conventional approaches do not include a mechanism to determine which injectors possess risk. Additionally, conventional approaches may have a practice of shutting down injectors before drilling a well around the vicinity of the injectors. However, disturbing these injectors can result in negative consequences associated with the dynamics of hydrocarbon production in the field. Furthermore, there is no procedure to identify which injector poses a threat to the wells being drilled next to it.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

FIGS. 2 to 4 are diagrams showing different configurations of a new well relative to existing injector wells, according to some implementations of the present disclosure.

Like reference numbers and designations in the various drawings indicate like elements.

DETAILED DESCRIPTION

The following detailed description describes techniques for managing injector wells, for example, in the oil industry.

For example, managing injector wells can consider drilling and workover operations where nearby injectors may need to be interrupted to preserve the safety of the drilling operations.

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

In some implementations, techniques of the present disclosure can include a scoring system for identifying the potential risk of each injector. The scoring system and resulting scores can be used in deciding whether or not to shut down a particular injector. The scoring system can use a set of scoring criteria, with each scoring criterion having a different weight. When the weighted criteria are combined, the weighted sum (or other mathematical function) can provide or represent an Injector Riskiness Score (IRS) indicating an injector's estimated risk to operations. In some implementations, weighted scores can include, for each scoring criterion, a sub-score associated with a type or a numeric value corresponding to the scoring criterion. An example type is a horizontal vs. a vertical well profiles. In this example, each type of well profile can be assigned a different sub-score to be included in the weighted sum, with horizontal wells being assigned a greater sub-score (indicating a greater risk). Numeric values for a scoring criterion can include, for example, a sub-score associated with a distance of an injector from a producer, with higher sub-scores used for closer distances. Based on the IRS, a decision can be made to shut down the injector or leave the injector in operation. Leaving injectors in operation that do not need to be shut down can ensure optimization of assets, and avoid unnecessary interruptions to production. Optimizing assets can refer, for example, to achieving full use of assets resulting in a performance greater than a predefined threshold. Measuring optimization can also include tracking a number of injectors not shut down (for example, due to low IRS scores) that otherwise would be shut down under conventional procedures.

Figure 1:
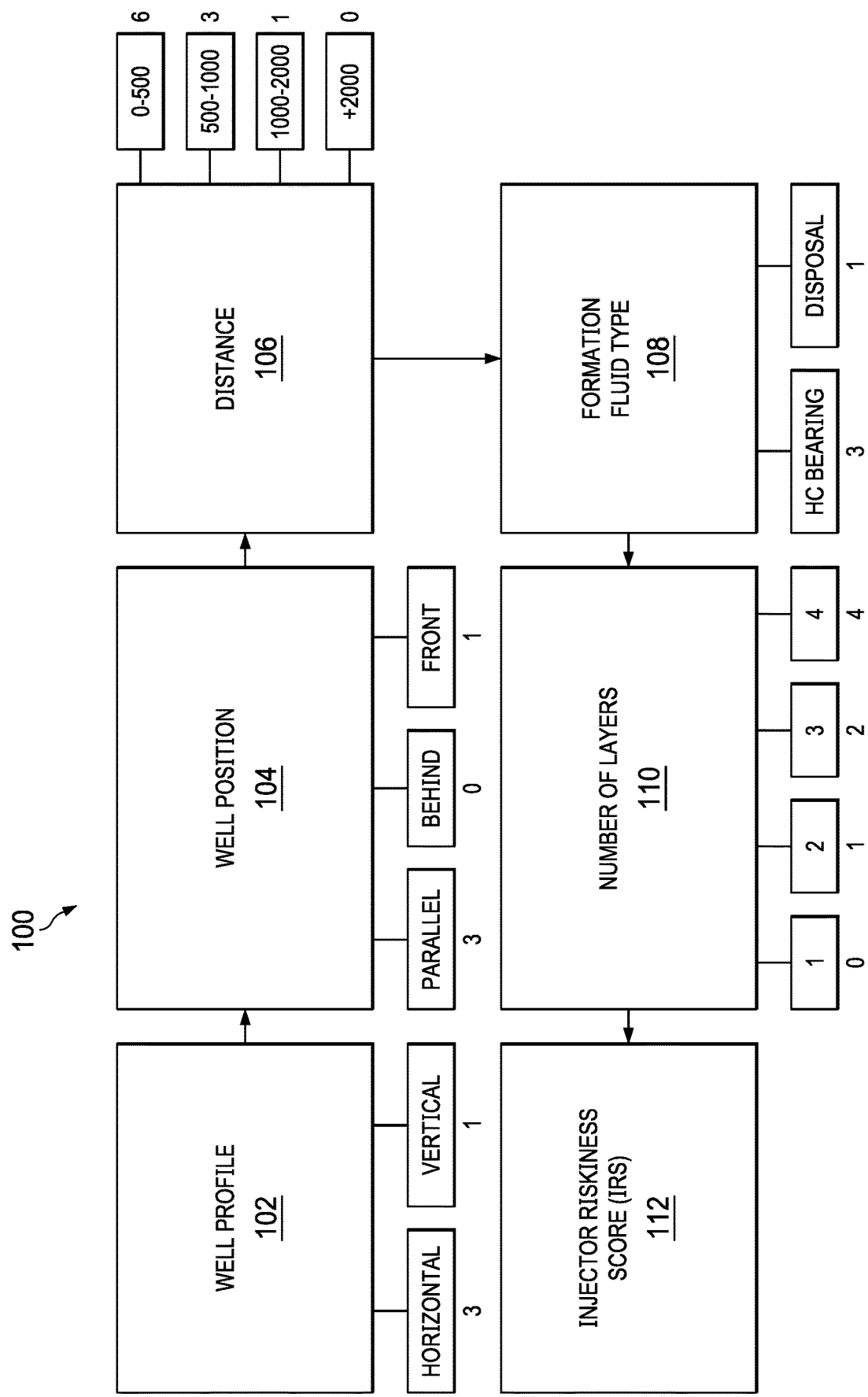
FIG. 1 is a block diagram showing an example of a process that can be used for executing an Injector Riskiness Score (IRS) matrix, according to some implementations of the present disclosure.

FIG. 1 is a block diagram showing an example of a process 100 that can be used for executing an Injector Riskiness Score (IRS) matrix, according to some implementations of the present disclosure. In some implementations, the matrix can be composed of at least five indicators used as scoring criteria in determining the risk that an existing injector poses to a new well to be being drilled. Each indicator is a separate element having its own associated weight for use in determining a weighted sum used for the IRS. The process 100 includes the use of criteria identified by elements 102-110, corresponding to five indicators, all used to create an IRS 112. FIG. 1 illustrates weights (or sub-scores) that are displayed next to each of the elements 102-110. Each sub-score represents the riskiness level of that element, with a value determined from a type of the injector (for example, horizontal vs. vertical well) or a numeric value (for example, distance of the injector from a location of a new well to be drilled).

A well profile 102 can include weighted scores having values corresponding to whether the injector well is Horizontal or Vertical. For example, Horizontal wells can be assigned a sub-score of 3, while a sub-score of 1 can be used for Vertical wells. In some implementations, other values besides 1 and 3 may be possible based on further refinements of verticalness or horizontalness.

Figure 3:
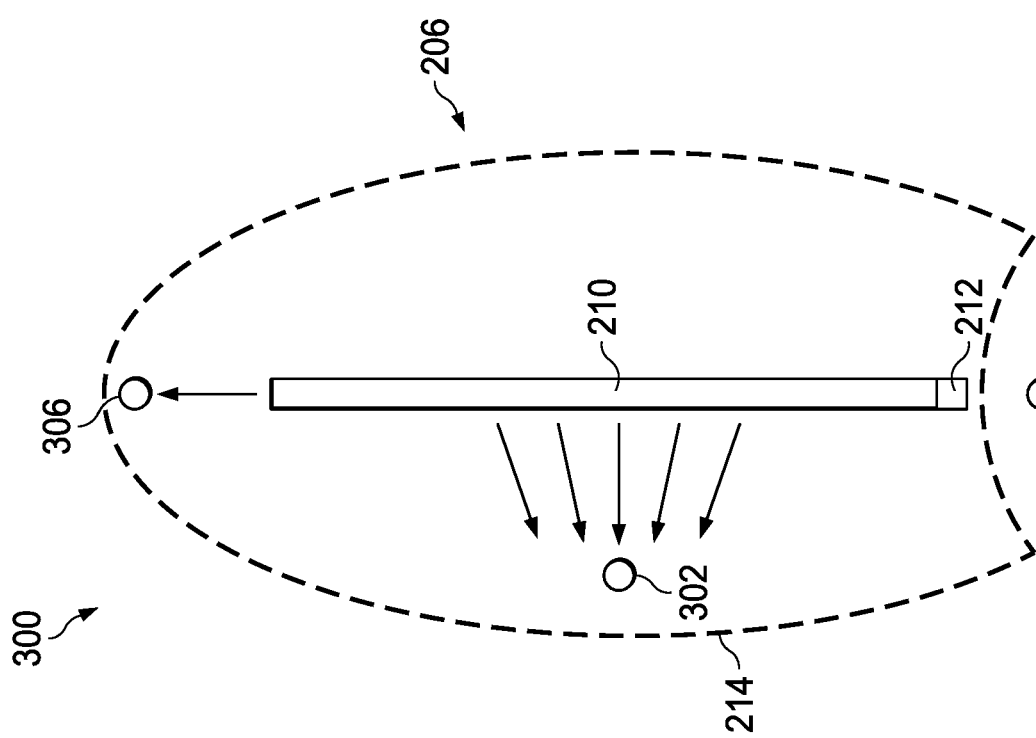

A well position 104 can indicate, for example, a positional relationship between an injector and a producer. Example weighted scores (or sub-scores) can be 3 for a Parallel position, 0 (zero) for a Behind position, and 1 for a Front position. FIG. 3 shows examples of types of positional relationships.

A distance 106 can be used to generate a weighted score associated with the distance between the injector and the producer. Example weighted scores (or sub-scores) can include, for example, a value of 6 for a distance in the range of 0-500 meters (m), a value of 3 for a distance greater than 500 m and up to 1000 m, a value of 1 for a distance greater than 1000 m and up to 2000 m, and a value of 0 (zero) for a distance greater than 2000 m. Other distance granularities are possible.

A formation fluid type 108 can include weighted scores corresponding to whether the formation fluid type of the injector is hydrocarbon (HC) Bearing or Water Disposal. HC Bearing formation fluid types can be assigned a sub-score of 3 for horizontal wells. A sub-score of 1 can be used for Water Disposal formation fluid types. In some implementations, other values besides 1 and 3 may be possible based on variations in formation fluid type.

A number of layers 110 can be used to generate a weighted score based on a number of layers in the reservoir that are intersected by the injector, with higher numbers of layers resulting in greater risks (and higher sub-scores). Example weighted scores (or sub-scores) can include a sub-score of 0 (zero) associated with one layer, a sub-score of 1 associated with two layers, a sub-score of 2 associated with three layers, and a sub-score of 4 associated with four layers.

The sub-scores associated with the elements 102-110 can be used to produce the IRS 112. For example, an IRS of 11 can be produced when an injector has a well profile of horizontal (a score of 3), a well position of Parallel (a score of 3), a distance exceeding 2000 m (a score of 0), a formation fluid type of Water Disposal (a score of 1), and four or more layers (a score of 4) can produce. In some implementations, particular elements of the elements 102-110 can be considered as greater indicators of risk, and can be element-weighted accordingly. For example, the number of layers 110 may be considered as a greater contributor to the IRS 112 than the distance 106.

The examples of FIGS. 2-6 that follow show different criteria that can affect the value of the IRS, the components of which are described with reference to FIG. 1. In some implementations, a software application can be developed to ease the calculation of IRS (FIG. 7).

Figure 4:
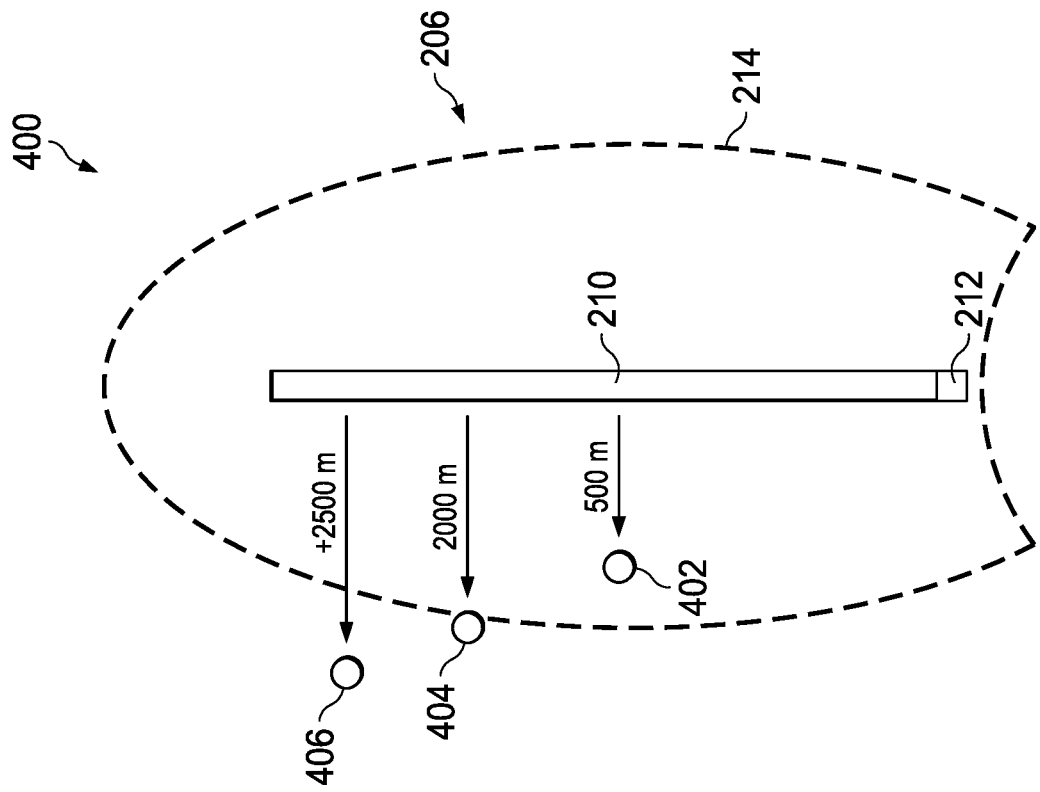

FIGS. 2 to 4 are diagrams showing different configurations 200, 300, and 400 of a new well 202 relative to existing injector wells, according to some implementations of the present disclosure. The different configurations 200, 300, and 400 can be used to explain each indicator's risk and why it matters in placing a new well next to an injector.

Referring to FIG. 2, the configuration 200 shows new well 202 in relation to a vertical injector well 204 (depicted as a top view) and a horizontal injector well 206 (depicted as a top view). The vertical injector well 204 has a well center 208 from which a well radius of investigation 214 is determined. The horizontal injector well 206 has a horizontal lateral path 210 and a lateral heal 212, from which the well radius of investigation 214 is determined. New wells to be drilled in the radius of investigation 214 are to be scored for risk.

Vertical injector wells have a circular radius of investigation (or effect). If a new well is drilled next to a vertical injector well, the injection charge (or pressure or flow) will be coming from almost a single point, which is the injector center.

Horizontal injector wells have an elliptical radius of investigation (or effect). If a new well is drilled next to a horizontal injector well, the injection charge (or pressure or flow) will be coming from multiple points along the injector horizontal lateral path.

Referring to FIG. 3, the configuration 300 shows new wells 302-306 in relation to the horizontal injector well 206. The locations can be used to determine the sub-score associated with the well position 104. For example, new well 302 has a Parallel well position, new well 304 has a Behind well position, new well 306 has a Front well position, resulting in sub-scores of 3, 0, and 1, respectively.

Well position is applicable to Horizontal wells only. If the new well is Parallel, then the effect is maximum as explained previously. If the new well is in Front, then there is only one point of charge (pressure/flow), so the behavior is similar to a Vertical well. If the new well is Behind, then there will be almost no effect, since the well heal is cased off and cemented with no communication to the reservoir. It is not expected that the injected fluid will immediately go backwards.

Referring to FIG. 4, the configuration 400 shows new wells 402-406 in relation to the horizontal injector well 206. The locations can be used to determine the sub-score associated with the distance 106. For example, nearby well 402 has a distance of 500 m, resulting in a distance sub-score of 6. For example, distanced well 404 has a distance of 2000 m, resulting in a distance sub-score of 1. For example, very far well 405 has a distance of 2500 m, resulting in a distance sub-score of 0 (zero).

Well distance contributes heavily in the overall impact of the injector effect. If the new well is close by, then the force or charge of the injectors is seen as being much stronger than a well that is farther. Just like a sprinkler or air-blower, the charge or effect of the injector is reduced when other wells are farther away. Thus, the closer the new well is to the injector, the greater the severity of an effect.

Figure 5:
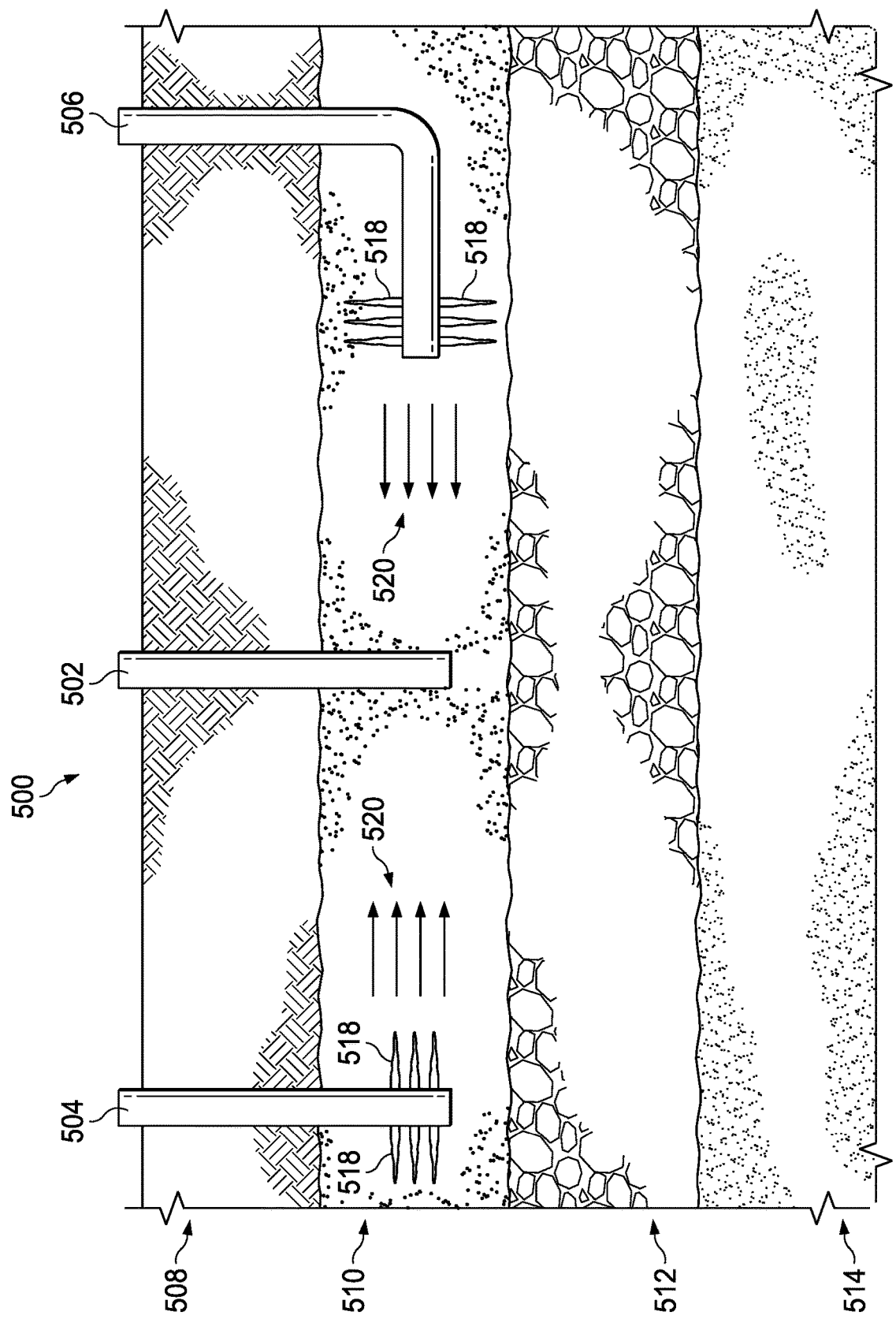
FIGS. 5 and 6 are diagrams showing different configurations, respectively, of a new well relative to existing injector wells, according to some implementations of the present disclosure.
Figure 6:
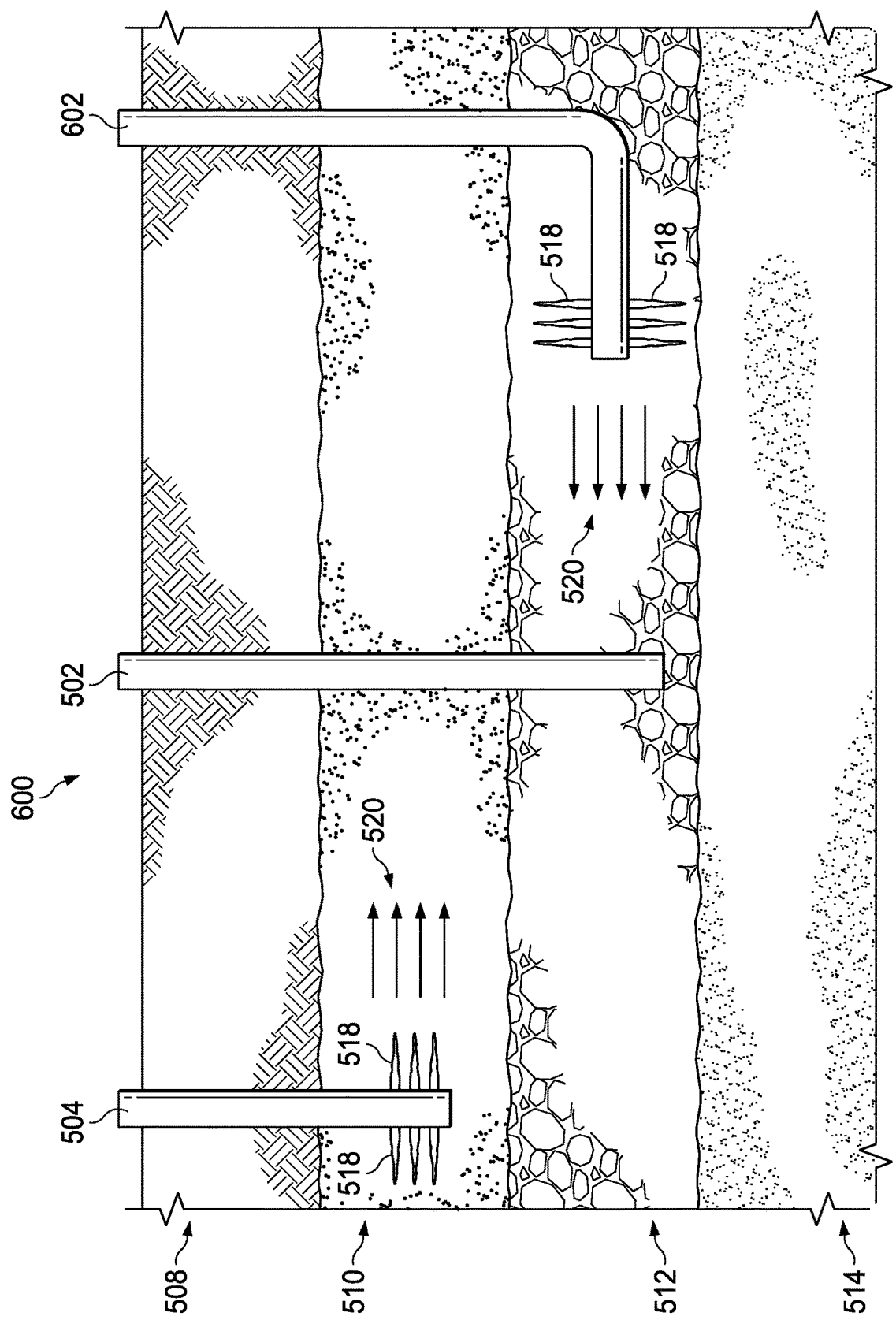
Figure 7:
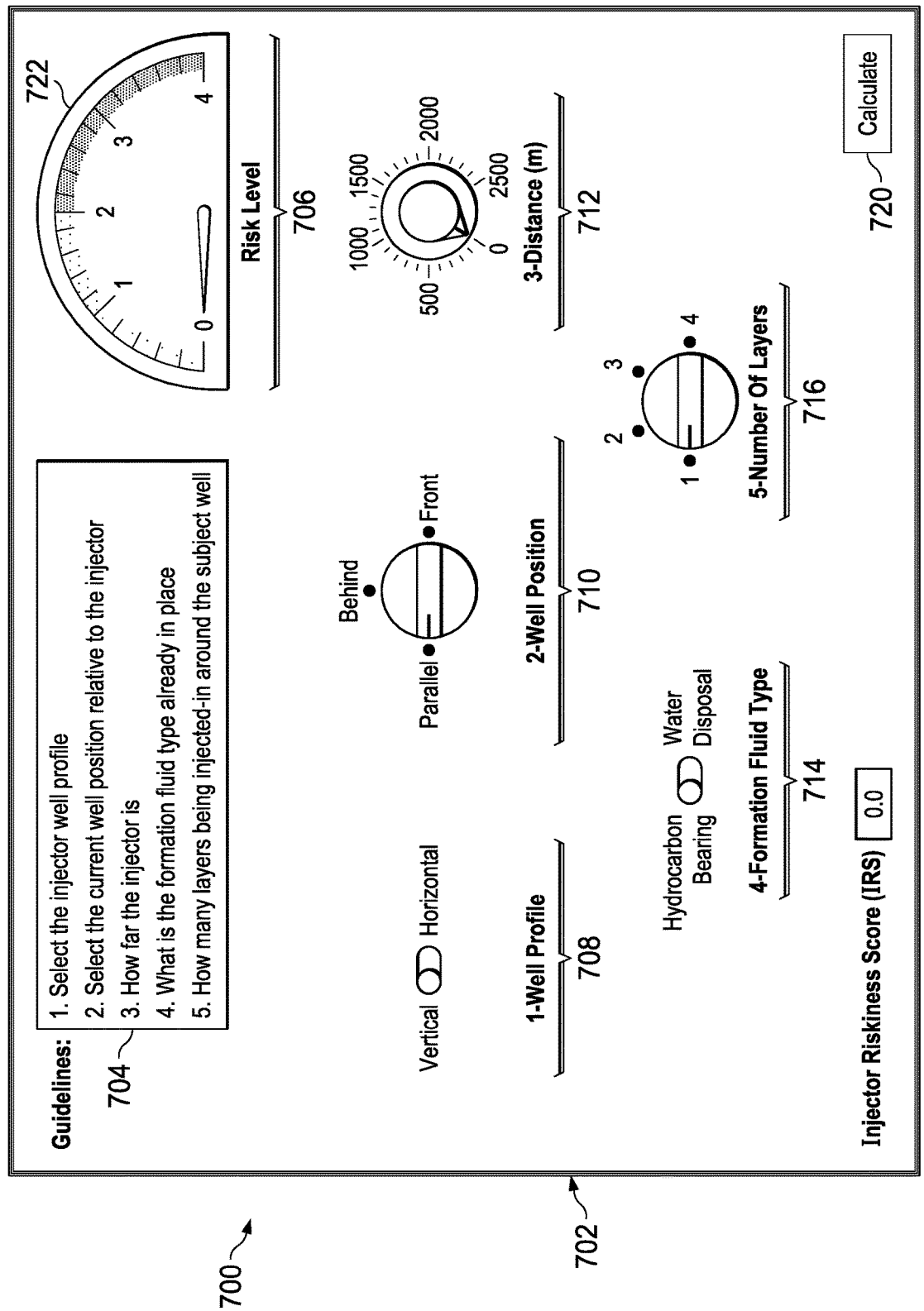
FIGS. 7-11 are screenshots showing example values and results of a risk scoring user interface (UI), according to some implementations of the present disclosure.

FIGS. 5 and 6 are diagrams showing different configurations 500 and 600, respectively, of a new well 502 relative to existing injector wells, according to some implementations of the present disclosure. The different configurations 500 and 600 can be used to explain each indicator's risk and why it matters in placing a new well next to an injector.

Referring to FIG. 5, the configuration 500 shows new well 502 in relation to a vertical injector well 504 (depicted as a side view) and a horizontal injector well 506 (depicted as a side view). In the configuration 500, the vertical injector well 504 passes through Layer #1 508 and Layer #2 510. The horizontal injector well 506 also passes through Layer #1 508 and Layer #2 510. In the configuration 500, neither well passes through Layer #3 512 or Layer #4 514. The vertical injector well 504 and the horizontal injector well 506 have perforations 518 that produce a possible charge 520 (or pressure or flow) toward the new well 502. New wells to be drilled in the area of vertical injector well 504 and the horizontal injector well 506 need to be scored for risk associated with the number of layers 110. In this case, a sub-score of 0 is given because the new well is going through a single layer into which both injectors are injecting. The injector is checked to see if it is injecting into the same layer as others or not. If all injectors are injecting into one layer, then the newly-drilled well will only deal with that layer alone in terms of pressure changes or the presence of a different fluid such as disposed water. However, if the injector is injecting into a different layer, then injector adds risk to the newly-drilled well. Having all injectors in one layer is less severe compared to having injectors injecting across multiple layers.

The fluid type being injected plays a big role on the IRS score. If water is being injected in a water reservoir (for example, Water Disposal), then the risk becomes less compared to a case in which water is injected in an HC Bearing formation (for example, secondary oil recovery or water flooding). If hydrocarbons are being injected, then the fluid that is being displaced toward the other well has the chance of inducing a kick of getting mixed with the cement when it's pumped, which can lead to a possible casing-casing annulus (CCA) pressure.

Referring to FIG. 6, the configuration 600 shows new well 502 in relation to vertical injector well 504 (depicted as a side view) and a horizontal injector well 602 (depicted as a side view). In the configuration 600, the vertical injector well 504 still passes through Layer #1 508 and Layer #2 510. The horizontal injector well 506 passes through Layer #1 508, Layer #2 510, and additionally, Layer #3 512. In this example, horizontal injector well 602 can be assigned a sub-score of 1 because the injector goes through three layers.

The number of injectors around a new well can add more risk, however, the number of layers is considered riskier. For example, three wells injecting in the same layer or reservoir is not as severe regarding risk as three wells injecting in three different layers. Any new well being drilled in a multi-layered formation could pass multiple layers when many of them are undergoing injection activities. This becomes complex because each layer has a certain pressure regime and possibly its own fluid type.

Azimuths/directions of horizontal wells can be different from how the wells are depicted in FIGS. 5 and 6. In the example shown in FIGS. 5 and 6, horizontal injector well 506 is shown going leftward, but other directions are possible. Further, injector wells 504 and 506 do not necessarily have to be perforated. The wells can be open-hole, as open-hole completions are very common. This differentiation is important because a perforated well is cased and cemented already.

FIGS. 7-11 are screenshots showing example values and results of a risk scoring user interface (U/I) 702, according to some implementations of the present disclosure. The risk scoring U/I 702 includes guidelines 704 that describe steps that a user can follow to enter information in controls 708-716 to generate a risk level 706. The controls 708-716 allow the user to make selections or define values associated with elements 102-110, for example. The risk level 706 can be displayed as a risk-level meter 722, indicating low to high risk. In some implementations, the risk level meter 722 can have color-coded regions, such as green for low risk, yellow for medium risk, and red for high risk. A numeric IRS score, such as a score of 11 described in the example provided with reference to FIG. 1 (or a resulting scaled score), can be provided in an IRS display 718, for example.

The risk scoring U/I 702 includes a well profile control 708 for indicating whether the injection well is a Vertical well (the selection in FIG. 7) or a Horizontal well. A well position control 710 can allow the user to designate whether the injector well is a Parallel well (the selection shown in the screenshot 700 of in FIG. 7), a Behind well, or a Front well. A distance control 712 can allow the user to use a dial to identify a distance between the new well to be drilled and the injector well (the selection in FIG. 7 showing 2250 m). A formation fluid type control 714 can be used by the user to designate whether the injector well is a HB Bearing type or a Water Disposal type (the selection shown in FIG. 7). A number of layers control 716 control can allow the user to designate a number of layers impacted by the injector well (the selection in FIG. 7 showing one layer). Once the controls have been used to designate the values associated with the injector well, a calculate control 720 can cause the application controlling the risk scoring U/I 702 to re-calculate the risk level. In screenshot 700, the controls are initialized to null and zero values, resulting in an IRS of 0.0.

As shown in FIG. 7, the well profile control 708 and the formation fluid type 714 control are clickable two-toggle switches. The well position type control 710 and the number of layers control 716 are clickable multiple-toggle switches. The distance control 712 is a mouse-operated numeric dial. Other types of controls are possible, including data entry fields, such as to enter a value for distance. Other display fields are possible, such as to display a numeric value of a distance selected using the distance control 712.

Figure 8:
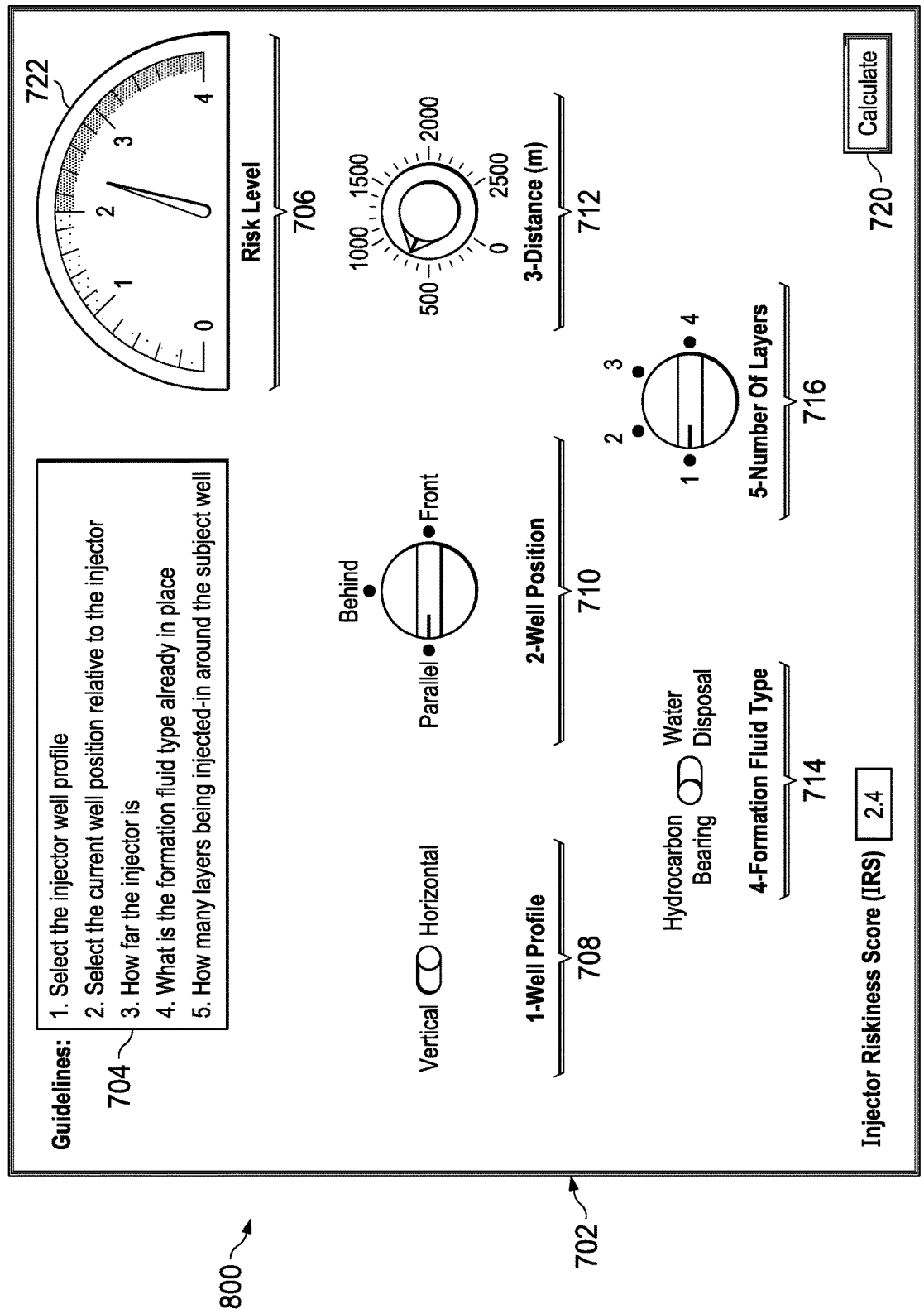

Referring to FIG. 8, the screenshot 800 shows a setting of Horizontal for the well profile control 708, Parallel for the well position control 710, a value of 750 m for the distance control 712, a setting of HC Bearing for the formation fluid type control 714, and a setting of 1 for the number of layers control 716. In this example, the IRS 718 is 2.4 and is indicated in the risk level 706. The risk scoring U/I 702 can scale the IRS 718 to a value between 0 and 4.0.

In this example, a new well is being drilled next to a horizontal injector. The new well is positioned parallel to the injector. The distance separating the wells is 500-1000 m, and the formation being injected into is HC Bearing. In area in which the new well is being, only one layer is being injected into. The IRS score is 2.4, placing the score in the highest or "red" zone, which means that it's too dangerous to keep the injector well operating. Thus, the injector must be shutdown. It's worth noting that if the well is closer (less than 500 m) and more than 1 layer is being injected into, then the IRS will be higher indicating a higher risk. Higher IRS score means that more risk is associated when drilling in that area. (see FIG. 9)

Figure 9:
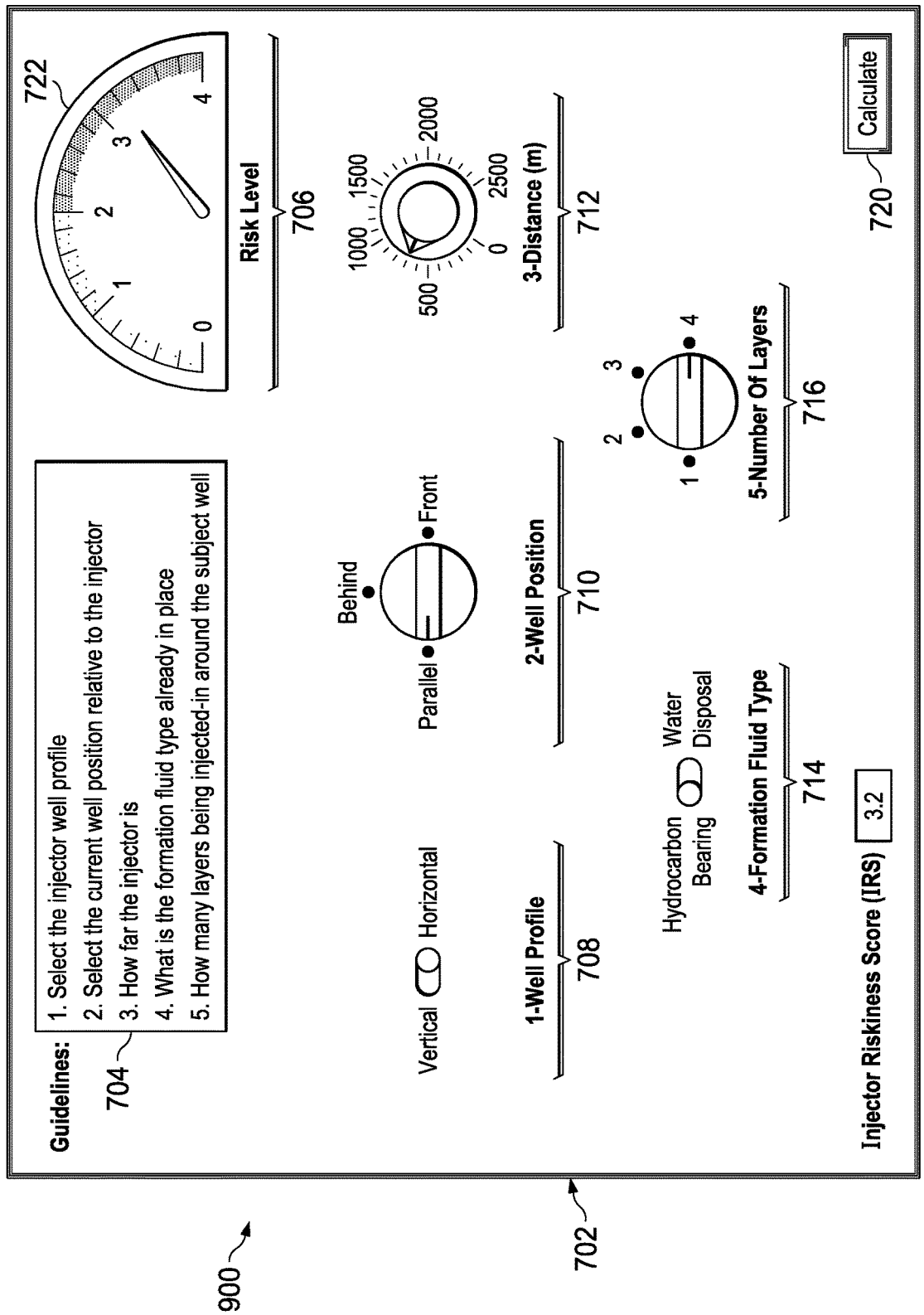

Referring to FIG. 9, the screenshot 900 shows a setting of Horizontal for the well profile control 708, a setting of Parallel for the well position control 710, a setting of 750 m for the distance control 712, a setting of HC Bearing for the formation fluid type control 714, and a setting of 4 for the number of layers control 716. In this example, the IRS 718 is 3.2 and is indicated in the risk level 706.

Figure 10:
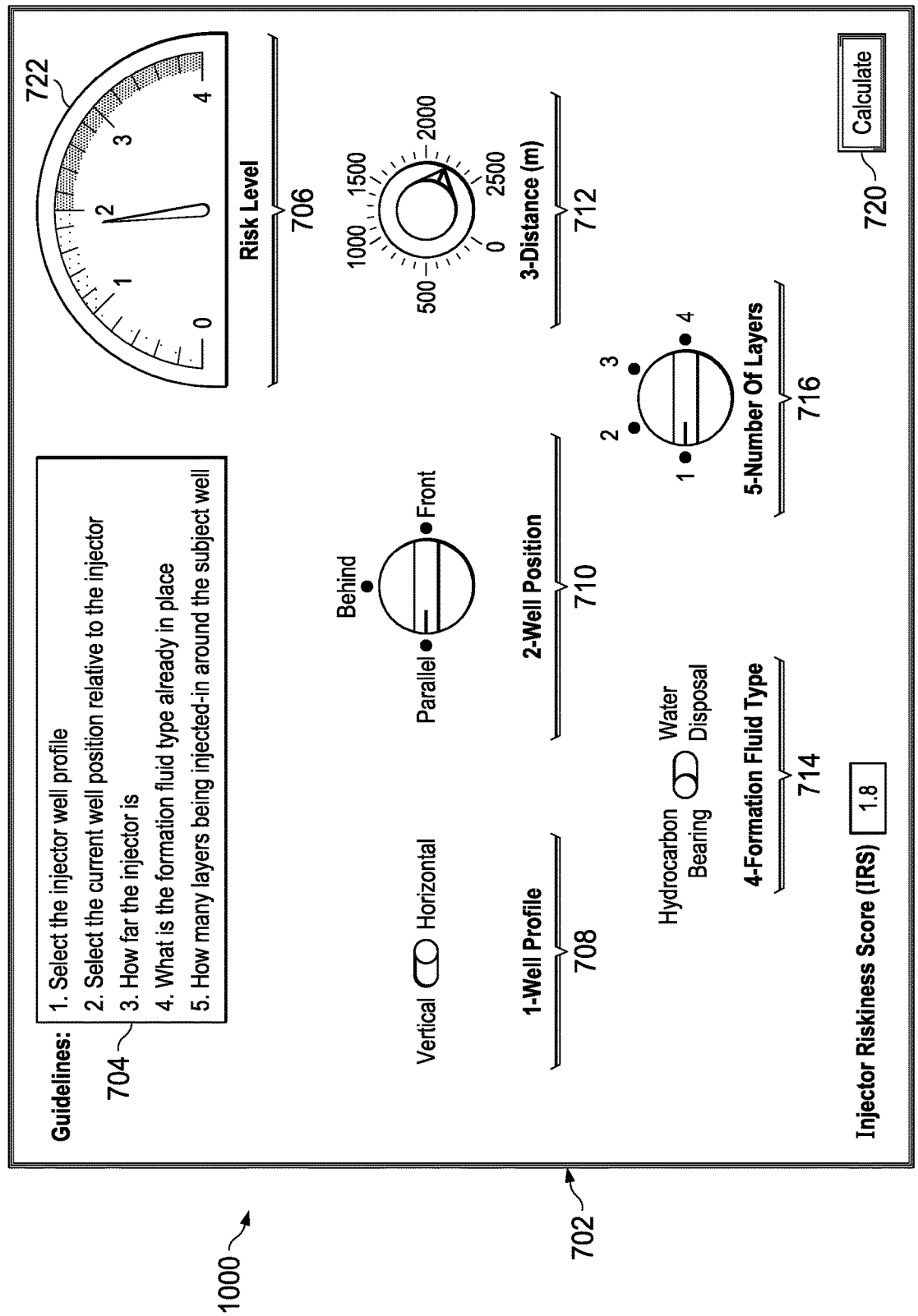

Referring to FIG. 10, the screenshot 1000 shows a setting of Horizontal for the well profile control 708, a setting of Parallel for the well position control 710, a setting of 2250 m for the distance control 712, a setting of HC Bearing for the formation fluid type control 714, and a setting of 1 for the number of layers control 716. In this example, the IRS 718 is 1.8 and is indicated in the risk level 706.

In this example, a new well is being drilled next to a Horizontal injector. The new well is positioned Parallel to the injector. The distance is more than 2000 m, and the formation being injected into is HC Bearing. In the area in which the new well is being drilled, only one layer is being injected into. The IRS score is 1.4, placing the score in the middle or "yellow" zone which means its medium risk well. Shutting off the well is option, and its presence needs to be acknowledged since it's on the high end of reaching a critical well.

Figure 11:
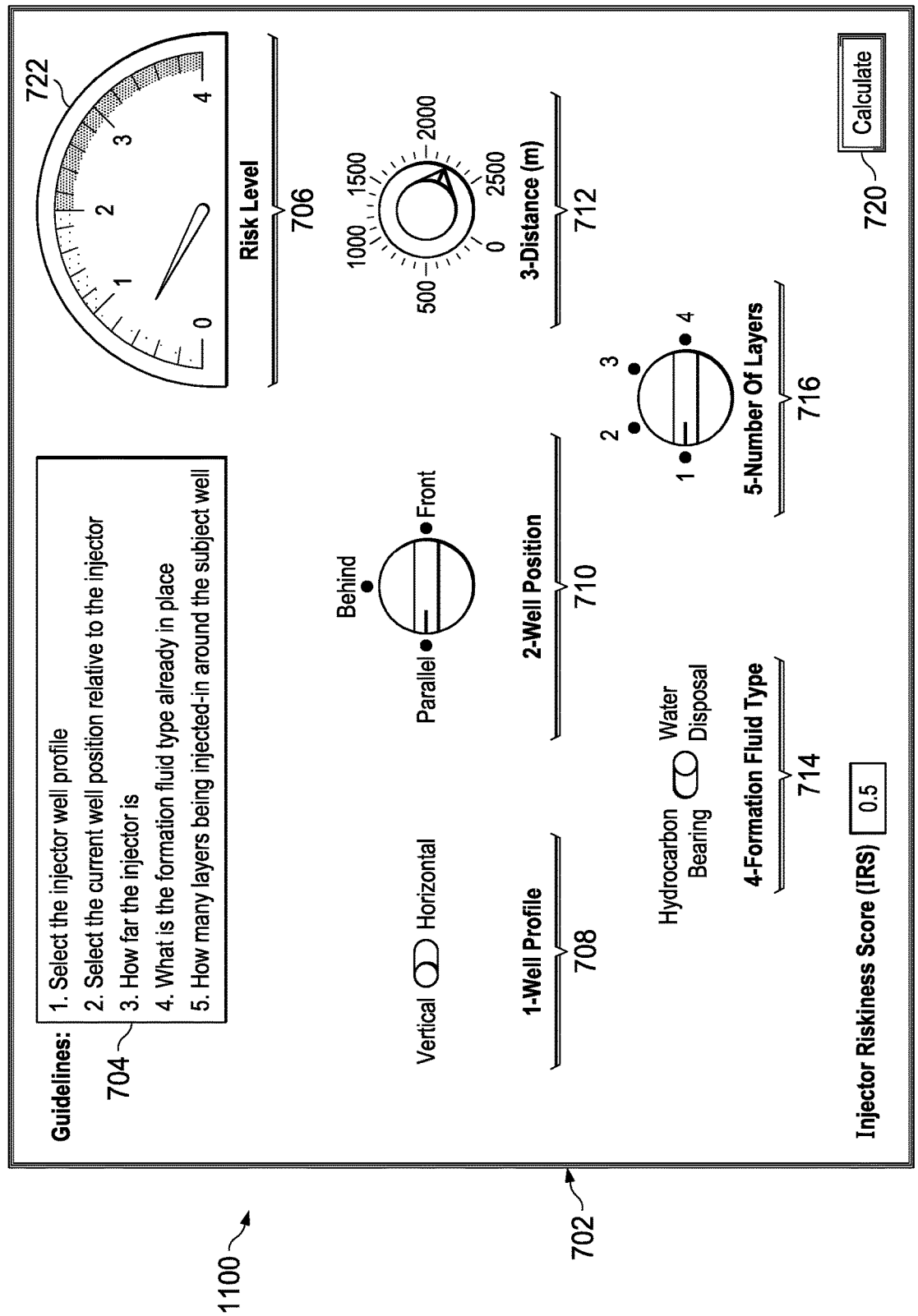

Referring to FIG. 11, the screenshot 1100 shows a setting of Vertical for the well profile control 708, a setting of Parallel for the well position control 710, a setting of 2250 m for the distance control 712, a setting of Water Disposal for the formation fluid type control 714, and a setting of 1 for the number of layers control 716. In this example, the IRS 718 is 0.5 and is indicated in the risk level 706.

In this example, a new well is being drilled next to a vertical injector. The new well position in relation to the injector is irrelevant in a vertical well. The distance is more than 2000 m, and the formation being injected into is Water Disposal. In an area in which the new well is being drilled, only one layer is being injected into. The IRS score is 0.5, placing the score in the low or "green" zone, which means it is a low-risk injection well. Shutting the well is unnecessary, and its presence doesn't need to be acknowledged.

Once the sum of the weights is calculated, IRS is produced and an indicator (FIG. 7) that will represent the riskiness level. The lowest or "green" zone indicated a safe zone where the injector doesn't pose any threat and it can be ignored. The middle or "yellow" zone means that the injector presence should be acknowledged and shutting it off is optional. Whereas the highest or "red" zone is critical, meaning that shutting off the injector is a highly recommended.

The higher the IRS value, the more critical the area is. For example, if the score is higher than 3, and more than 2-3 layers is being injected into, then the drilling process will be challenging even if the injector is shutdown. This is due to the multiple pressure regimes across multiple layers being faced.

Figure 12:
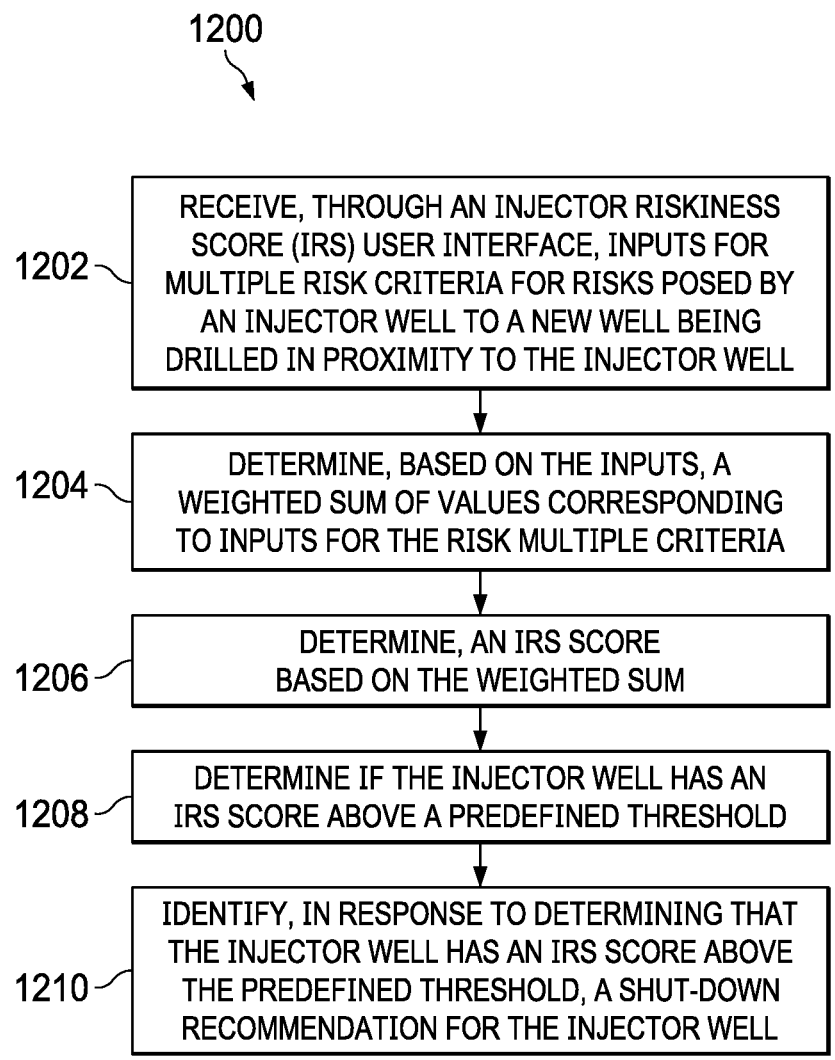
FIG. 12 is a flowchart of an example of a method for determining whether an injector should be shut down based on risks the injector poses on a new well being drilled, according to some implementations of the present disclosure.

FIG. 12 is a flowchart of an example of a method 1200 for determining whether an injector should be shut down based on risks the injector poses on a new well being drilled, according to some implementations of the present disclosure. For clarity of presentation, the description that follows generally describes method 1200 in the context of the other figures in this description. However, it will be understood that method 1200 can be performed, for example, by any suitable system, environment, software, and hardware, or a combination of systems, environments, software, and hardware, as appropriate. In some implementations, various steps of method 1200 can be run in parallel, in combination, in loops, or in any order.

At 1202, inputs for multiple risk criteria are received through an injector riskiness score (IRS) user interface for processing risks posed by an injector well to a new well being drilled in proximity to the injector well. The inputs can define, for example, a well profile type of the injector well, a well position of the new well in relation to a location of the injector well, a distance between the location of the injector well and a location of the new well to be drilled, a formation fluid type of the injector well, and a number of layers into which the injector well injects a fluid. The inputs can be received from a user using the risk scoring U/I 702, for example. From 1202, method 1200 proceeds to 1204.

At 1204, a weighted sum of values corresponding to inputs for the risk multiple criteria is determined based on the inputs. For example, the weighted sum of values can depend on the sub-scores associated with the elements 102-110. From 1204, method 1200 proceeds to 1206.

At 1206, an IRS score is determined based on the weighted sum. For example, the IRS score can be determined based on the IRS matrix and the elements 102-110, described with reference to FIG. 1. From 1206, method 1200 proceeds to 1208.

At 1208, a determination is made whether the injector well has an IRS score above a predefined threshold. For example, an IRS score above a threshold of 2 (for example, after scaling), corresponding to the high level threat region on the risk level meter 722. From 1208, method 1200 proceeds to 1210.

At 1210, a shut-down recommendation for the injector well is identified in response to determining that the injector well has an IRS score above the predefined threshold. In some implementations, the recommendation can be presented in the form of displaying, in the IRS interface, the risk level meter 722 having color-coded regions for low, medium, and high risk. After 1210, method 1200 can stop.

In some implementations, in addition to (or in combination with) any previously-described features, techniques of the present disclosure can include the following. Customized user interfaces can present intermediate or final results of the above described processes to a user. The presented information can be presented in one or more textual, tabular, or graphical formats, such as through a dashboard. The information can be presented at one or more on-site locations (such as at an oil well or other facility), on the Internet (such as on a webpage), on a mobile application (or "app"), or at a central processing facility. The presented information can include suggestions, such as suggested changes in parameters or processing inputs, that the user can select to implement improvements in a production environment, such as in the exploration, production, and/or testing of petrochemical processes or facilities. For example, the suggestions can include parameters that, when selected by the user, can cause a change or an improvement in drilling parameters (including speed and direction) or overall production of a gas or oil well. The suggestions, when implemented by the user, can improve the speed and accuracy of calculations, streamline processes, improve models, and solve problems related to efficiency, performance, safety, reliability, costs, downtime, and the need for human interaction. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility.

Figure 13:
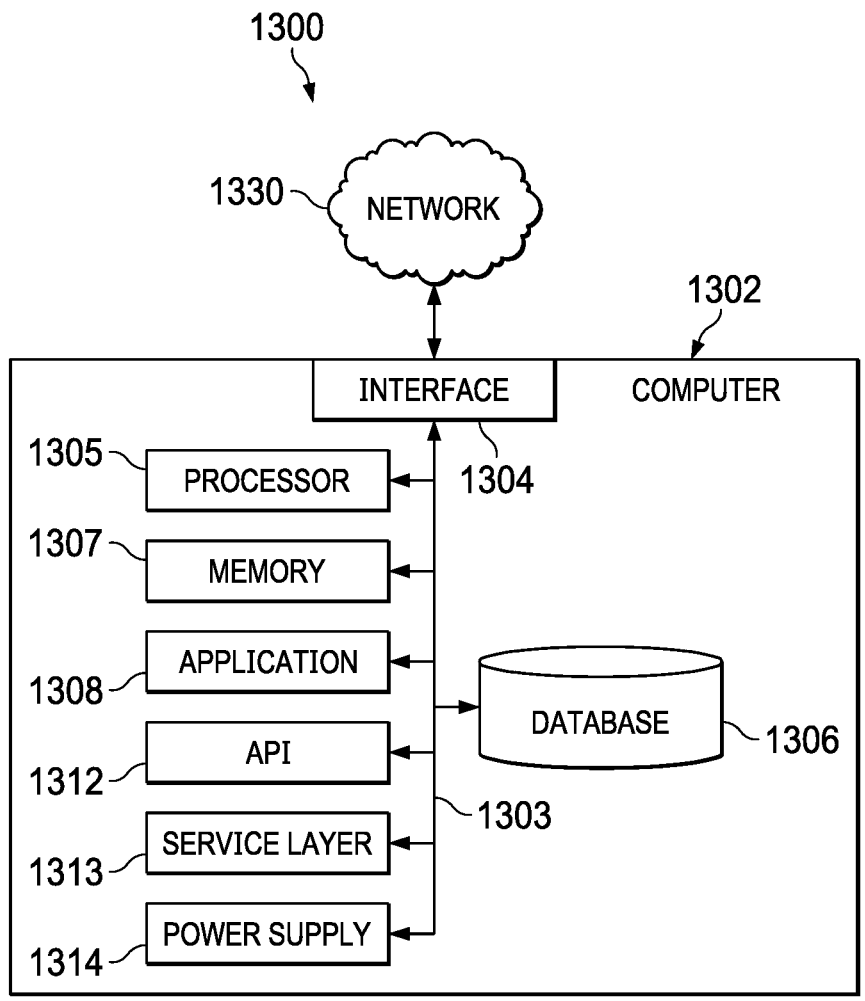
FIG. 13 is a block diagram illustrating an example computer system used to provide computational functionalities associated with described algorithms, methods, functions, processes, flows, and procedures as described in the present disclosure, according to some implementations of the present disclosure.

FIG. 13 is a block diagram of an example computer system 1300 used to provide computational functionalities associated with described algorithms, methods, functions, processes, flows, and procedures described in the present disclosure, according to some implementations of the present disclosure. The illustrated computer 1302 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1302 can include input devices such as keypads, keyboards, and touch screens that can accept user information. Also, the computer 1302 can include output devices that can convey information associated with the operation of the computer 1302. The information can include digital data, visual data, audio information, or a combination of information. The information can be presented in a graphical user interface (UI) (or GUI).

The computer 1302 can serve in a role as a client, a network component, a server, a database, a persistency, or components of a computer system for performing the subject matter described in the present disclosure. The illustrated computer 1302 is communicably coupled with a network 1330. In some implementations, one or more components of the computer 1302 can be configured to operate within different environments, including cloud-computing-based environments, local environments, global environments, and combinations of environments.

At a top level, the computer 1302 is an electronic computing device operable to receive, transmit, process, store, and manage data and information associated with the described subject matter. According to some implementations, the computer 1302 can also include, or be communicably coupled with, an application server, an email server, a web server, a caching server, a streaming data server, or a combination of servers.

The computer 1302 can receive requests over network 1330 from a client application (for example, executing on another computer 1302). The computer 1302 can respond to the received requests by processing the received requests using software applications. Requests can also be sent to the computer 1302 from internal users (for example, from a command console), external (or third) parties, automated applications, entities, individuals, systems, and computers.

Each of the components of the computer 1302 can communicate using a system bus 1303. In some implementations, any or all of the components of the computer 1302, including hardware or software components, can interface with each other or the interface 1304 (or a combination of both) over the system bus 1303. Interfaces can use an application programming interface (API) 1312, a service layer 1313, or a combination of the API 1312 and service layer 1313. The API 1312 can include specifications for routines, data structures, and object classes. The API 1312 can be either computer-language independent or dependent. The API 1312 can refer to a complete interface, a single function, or a set of APIs.

The service layer 1313 can provide software services to the computer 1302 and other components (whether illustrated or not) that are communicably coupled to the computer 1302. The functionality of the computer 1302 can be accessible for all service consumers using this service layer. Software services, such as those provided by the service layer 1313, can provide reusable, defined functionalities through a defined interface. For example, the interface can be software written in JAVA, C++, or a language providing data in extensible markup language (XML) format. While illustrated as an integrated component of the computer 1302, in alternative implementations, the API 1312 or the service layer 1313 can be stand-alone components in relation to other components of the computer 1302 and other components communicably coupled to the computer 1302. Moreover, any or all parts of the API 1312 or the service layer 1313 can be implemented as child or sub-modules of another software module, enterprise application, or hardware module without departing from the scope of the present disclosure.

The computer 1302 includes an interface 1304. Although illustrated as a single interface 1304 in FIG. 13, two or more interfaces 1304 can be used according to particular needs, desires, or particular implementations of the computer 1302 and the described functionality. The interface 1304 can be used by the computer 1302 for communicating with other systems that are connected to the network 1330 (whether illustrated or not) in a distributed environment. Generally, the interface 1304 can include, or be implemented using, logic encoded in software or hardware (or a combination of software and hardware) operable to communicate with the network 1330. More specifically, the interface 1304 can include software supporting one or more communication protocols associated with communications. As such, the network 1330 or the interface's hardware can be operable to communicate physical signals within and outside of the illustrated computer 1302.

The computer 1302 includes a processor 1305. Although illustrated as a single processor 1305 in FIG. 13, two or more processors 1305 can be used according to particular needs, desires, or particular implementations of the computer 1302 and the described functionality. Generally, the processor 1305 can execute instructions and can manipulate data to perform the operations of the computer 1302, including operations using algorithms, methods, functions, processes, flows, and procedures as described in the present disclosure.

The computer 1302 also includes a database 1306 that can hold data for the computer 1302 and other components connected to the network 1330 (whether illustrated or not). For example, database 1306 can be an in-memory, conventional, or a database storing data consistent with the present disclosure. In some implementations, database 1306 can be a combination of two or more different database types (for example, hybrid in-memory and conventional databases) according to particular needs, desires, or particular implementations of the computer 1302 and the described functionality. Although illustrated as a single database 1306 in FIG. 13, two or more databases (of the same, different, or combination of types) can be used according to particular needs, desires, or particular implementations of the computer 1302 and the described functionality. While database 1306 is illustrated as an internal component of the computer 1302, in alternative implementations, database 1306 can be external to the computer 1302.

The computer 1302 also includes a memory 1307 that can hold data for the computer 1302 or a combination of components connected to the network 1330 (whether illustrated or not). Memory 1307 can store any data consistent with the present disclosure. In some implementations, memory 1307 can be a combination of two or more different types of memory (for example, a combination of semiconductor and magnetic storage) according to particular needs, desires, or particular implementations of the computer 1302 and the described functionality. Although illustrated as a single memory 1307 in FIG. 13, two or more memories 1307 (of the same, different, or combination of types) can be used according to particular needs, desires, or particular implementations of the computer 1302 and the described functionality. While memory 1307 is illustrated as an internal component of the computer 1302, in alternative implementations, memory 1307 can be external to the computer 1302.

The application 1308 can be an algorithmic software engine providing functionality according to particular needs, desires, or particular implementations of the computer 1302 and the described functionality. For example, application 1308 can serve as one or more components, modules, or applications. Further, although illustrated as a single application 1308, the application 1308 can be implemented as multiple applications 1308 on the computer 1302. In addition, although illustrated as internal to the computer 1302, in alternative implementations, the application 1308 can be external to the computer 1302.

The computer 1302 can also include a power supply 1314. The power supply 1314 can include a rechargeable or non-rechargeable battery that can be configured to be either user- or non-user-replaceable. In some implementations, the power supply 1314 can include power-conversion and management circuits, including recharging, standby, and power management functionalities. In some implementations, the power-supply 1314 can include a power plug to allow the computer 1302 to be plugged into a wall socket or a power source to, for example, power the computer 1302 or recharge a rechargeable battery.

There can be any number of computers 1302 associated with, or external to, a computer system containing computer 1302, with each computer 1302 communicating over network 1330. Further, the terms "client," "user," and other appropriate terminology can be used interchangeably, as appropriate, without departing from the scope of the present disclosure. Moreover, the present disclosure contemplates that many users can use one computer 1302 and one user can use multiple computers 1302.

Described implementations of the subject matter can include one or more features, alone or in combination.

For example, in a first implementation, a computer-implemented method includes the following. Inputs for multiple risk criteria are received through an injector riskiness score (IRS) user interface for processing risks posed by an injector well to a new well being drilled in proximity to the injector well. A weighted sum of values corresponding to inputs for the risk multiple criteria is determined based on the inputs. An IRS score is determined based on the weighted sum. A determination is made whether the injector well has an IRS score above a predefined threshold. A shut-down recommendation for the injector well is identified in response to determining that the injector well has an IRS score above the predefined threshold.

The foregoing and other described implementations can each, optionally, include one or more of the following features:

A first feature, combinable with any of the following features, where the inputs define a well profile type of the injector well, a well position of the new well in relation to a location of the injector well, a distance between the location of the injector well and a location of the new well to be drilled, a formation fluid type of the injector well, and a number of layers into which the injectors are injecting a fluid around a newly-drilled well.

A second feature, combinable with any of the previous or following features, the method further including displaying, in the IRS interface, a risk level meter having color-coded regions for low, medium, and high risk.

A third feature, combinable with any of the previous or following features, the method further including scaling the IRS score before representing the IRS score on the risk level meter.

A fourth feature, combinable with any of the previous or following features, where controls for selecting the well profile type and the formation fluid type are clickable two-toggle switches.

A fifth feature, combinable with any of the previous or following features, where controls for selecting the well position type and the number of layers are clickable multiple-toggle switches.

A sixth feature, combinable with any of the previous or following features, where a control for selecting the distance is a mouse-operated numeric dial.

In a second implementation, a non-transitory, computer-readable medium stores one or more instructions executable by a computer system to perform operations including the following. Inputs for multiple risk criteria are received through an injector riskiness score (IRS) user interface for processing risks posed by an injector well to a new well being drilled in proximity to the injector well. A weighted sum of values corresponding to inputs for the risk multiple criteria is determined based on the inputs. An IRS score is determined based on the weighted sum. A determination is made whether the injector well has an IRS score above a predefined threshold. A shut-down recommendation for the injector well is identified in response to determining that the injector well has an IRS score above the predefined threshold.

The foregoing and other described implementations can each, optionally, include one or more of the following features:

A first feature, combinable with any of the following features, where the inputs define a well profile type of the injector well, a well position of the new well in relation to a location of the injector well, a distance between the location of the injector well and a location of the new well to be drilled, a formation fluid type of the injector well, and a number of layers into which the injectors are injecting a fluid around a newly-drilled well.

A second feature, combinable with any of the previous or following features, the operations further including displaying, in the IRS interface, a risk level meter having color-coded regions for low, medium, and high risk.

A third feature, combinable with any of the previous or following features, the operations further including scaling the IRS score before representing the IRS score on the risk level meter.

A fourth feature, combinable with any of the previous or following features, where controls for selecting the well profile type and the formation fluid type are clickable two-toggle switches.

A fifth feature, combinable with any of the previous or following features, where controls for selecting the well position type and the number of layers are clickable multiple-toggle switches.

A sixth feature, combinable with any of the previous or following features, where a control for selecting the distance is a mouse-operated numeric dial.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. Inputs for multiple risk criteria are received through an injector riskiness score (IRS) user interface for processing risks posed by an injector well to a new well being drilled in proximity to the injector well. A weighted sum of values corresponding to inputs for the risk multiple criteria is determined based on the inputs. An IRS score is determined based on the weighted sum. A determination is made whether the injector well has an IRS score above a predefined threshold. A shut-down recommendation for the injector well is identified in response to determining that the injector well has an IRS score above the predefined threshold.

The foregoing and other described implementations can each, optionally, include one or more of the following features:

A first feature, combinable with any of the following features, where the inputs define a well profile type of the injector well, a well position of the new well in relation to a location of the injector well, a distance between the location of the injector well and a location of the new well to be drilled, a formation fluid type of the injector well, and a number of layers into which the injectors are injecting a fluid around a newly-drilled well.

A second feature, combinable with any of the previous or following features, the operations further including displaying, in the IRS interface, a risk level meter having color-coded regions for low, medium, and high risk.

A third feature, combinable with any of the previous or following features, the operations further including scaling the IRS score before representing the IRS score on the risk level meter.

A fourth feature, combinable with any of the previous or following features, where controls for selecting the well profile type and the formation fluid type are clickable two-toggle switches.

A fifth feature, combinable with any of the previous or following features, where controls for selecting the well position type and the number of layers are clickable multiple-toggle switches.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY.

The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network.

Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
    receiving, through a user interface, inputs for operational criteria for risks posed by an injector well to a new well being drilled in proximity to the injector well, the inputs defining a number of layers into which injectors are injecting a fluid around the new well;
    determining, based on the inputs, sub-scores corresponding to the inputs for the operational criteria, wherein the inputs define a well profile type of the injector well, a well position of the new well in relation to a location of the injector well, a distance between the location of the injector well, a location of the new well to be drilled, and a formation fluid type of the injector well;
    determining an operational score based on the sub-scores corresponding to the inputs for the operational criteria, the sub-scores reflecting a well profile type risk, a formation fluid type risk, and a pressure risk of a configuration of the new well relative to an injection layer of the injector well and an injection target layer of the number of layers, wherein the pressure risk increases with a number of injections layers different from the injection target layer of the number of layers;
    determining whether the injector well has an operational score above a threshold; and
    identifying, in response to determining that the injector well has the operational score above the threshold, a shut-down recommendation for the injector well.

2. The computer-implemented method of claim 1, wherein the inputs define a well profile type of the injector well comprises a horizontal type or a vertical type, a well position of the new well defines positional relationship between the new well and the injector well comprising a parallel position, a behind position, or a front position, a distance between the location of the injector well, a location of the new well to be drilled comprising a distance classification relative to distance ranges, and a formation fluid type of the injector well comprising hydrocarbon bearing or water disposal.

3. The computer-implemented method of claim 2, wherein controls for selecting the well profile type and the formation fluid type are clickable two-toggle switches.

4. The computer-implemented method of claim 2, wherein controls for selecting the well position and the number of layers are clickable multiple-toggle switches.

5. The computer-implemented method of claim 2, wherein a control for selecting the distance is a mouse-operated numeric dial.

6. The computer-implemented method of claim 1, further comprising:
    displaying, in the user interface, a risk level meter having color-coded regions for low, medium, and high risk.

7. The computer-implemented method of claim 6, further comprising:

scaling the operational score before representing the operational score on the risk level meter.

8. A non-transitory, computer-readable medium storing one or more instructions executable by a computer system to perform operations comprising:
   receiving, through a user interface, inputs for operational criteria for risks posed by an injector well to a new well being drilled in proximity to the injector well, the inputs defining a number of layers into which injectors are injecting a fluid around the new well;
   determining, based on the inputs, sub-scores corresponding to the inputs for the operational criteria, wherein the inputs define a well profile type of the injector well, a well position of the new well in relation to a location of the injector well, a distance between the location of the injector well, a location of the new well to be drilled, and a formation fluid type of the injector well;
   determining an operational score based on the sub-scores corresponding to the inputs for the operational criteria, the sub-scores reflecting a well profile type risk, a formation fluid type risk, and a pressure risk of a configuration of the new well relative to an injection layer of the injector well and an injection target layer of the number of layers wherein the pressure risk increases with a number of injections layers different from the injection target layer of the number of layers;
   determining whether the injector well has an operational score above a threshold; and
   identifying, in response to determining that the injector well has the operational score above the threshold, a shut-down recommendation for the injector well.

9. The non-transitory, computer-readable medium of claim 8, wherein the inputs define a well profile type of the injector well comprises a horizontal type or a vertical type, a well position of the new well defines positional relationship between the new well and the injector well comprising a parallel position, a behind position, or a front position, a distance between the location of the injector well, a location of the new well to be drilled comprising a distance classification relative to distance ranges, and a formation fluid type of the injector well comprising hydrocarbon bearing or water disposal.

10. The non-transitory, computer-readable medium of claim 9, wherein controls for selecting the well profile type and the formation fluid type are clickable two-toggle switches.

11. The non-transitory, computer-readable medium of claim 9, wherein controls for selecting the well position and the number of layers are clickable multiple-toggle switches.

12. The non-transitory, computer-readable medium of claim 9, wherein a control for selecting the distance is a mouse-operated numeric dial.

13. The non-transitory, computer-readable medium of claim 8, the operations further comprising: displaying, in the user interface, a risk level meter having color-coded regions for low, medium, and high risk.

14. The non-transitory, computer-readable medium of claim 13, the operations further comprising:
   scaling the operational score before representing the operational score on the risk level meter.

15. A computer-implemented system, comprising: one or more processors; and
   a non-transitory computer-readable storage medium coupled to the one or more processors and storing programming instructions for execution by the one or more processors, the programming instructions instructing the one or more processors to perform operations comprising:
      receiving, through a user interface, inputs for operational criteria for risks posed by an injector well to a new well being drilled in proximity to the injector well, the inputs defining a number of layers into which injectors are injecting a fluid around the new well;
      determining, based on the inputs, sub-scores corresponding to the inputs for the operational criteria, wherein the inputs define a well profile type of the injector well, a well position of the new well in relation to a location of the injector well, a distance between the location of the injector well, a location of the new well to be drilled, and a formation fluid type of the injector well;
      determining an operational score based on the sub-scores corresponding to the inputs for the operational criteria, the sub-scores reflecting a well profile type risk, a formation fluid type risk, and a pressure risk of a configuration of the new well relative to an injection layer of the injector well and an injection target layer of the number of layers wherein the pressure risk increases with a number of injections layers different from the injection target layer of the number of layers;
      determining whether the injector well has an operational score above a threshold; and
      identifying, in response to determining that the injector well has the operational score above the threshold, a shut-down recommendation for the injector well.

16. The computer-implemented system of claim 15, wherein the inputs define a well profile type of the injector well comprises a horizontal type or a vertical type, a well position of the new well defines positional relationship between the new well and the injector well comprising a parallel position, a behind position, or a front position, a distance between the location of the injector well, a location of the new well to be drilled comprising a distance classification relative to distance ranges, and a formation fluid type of the injector well comprising hydrocarbon bearing or water disposal.

17. The computer-implemented system of claim 16, wherein controls for selecting the well profile type and the formation fluid type are clickable two-toggle switches.

18. The computer-implemented system of claim 16, wherein controls for selecting the well position and the number of layers are clickable multiple-toggle switches.

19. The computer-implemented system of claim 15, the operations further comprising:
   displaying, in the user interface, a risk level meter having color-coded regions for low, medium, and high risk.

20. The computer-implemented system of claim 19, the operations further comprising: scaling the operational score before representing the operational score on the risk level meter.

* * * * *

UNITED STATES PATENT AND TRADEMARK OFFICE
CERTIFICATE OF CORRECTION

PATENT NO. : 12,387,117 B2  
APPLICATION NO. : 17/517023  
DATED : August 12, 2025  
INVENTOR(S) : Al-AbdulJabbar et al.

Page 1 of 1

It is certified that error appears in the above-identified patent and that said Letters Patent is hereby corrected as shown below:

In the Claims

Column 19, Line 24, Claim 8, please replace "layers" with -- layers, --.

Column 20, Line 28, Claim 15, please replace "layers" with -- layers, --.

Signed and Sealed this  
Twenty-third Day of September, 2025

John A. Squires  
*Director of the United States Patent and Trademark Office*